(12) United States Patent
Chahley et al.

(10) Patent No.: US 10,820,469 B2
(45) Date of Patent: Nov. 3, 2020

(54) SEED PLANTING UNIT OF AN AGRICULTURAL IMPLEMENT

(71) Applicant: CNH Industrial Canada, Ltd., Saskatoon (CA)

(72) Inventors: Dennis W. Chahley, Saskatchewan (CA); Jared S. Wright, Saskatchewan (CA)

(73) Assignee: CNH Industrial Canada, Ltd., Saskatoon (CA)

( * ) Notice: Subject to any disclaimer, the term of this patent is extended or adjusted under 35 U.S.C. 154(b) by 179 days.

(21) Appl. No.: 15/988,204

(22) Filed: May 24, 2018

(65) Prior Publication Data

US 2019/0357417 A1 Nov. 28, 2019

(51) Int. Cl.
*A01B 63/26* (2006.01)
*A01C 7/20* (2006.01)
*A01B 63/16* (2006.01)
*A01C 5/06* (2006.01)
*A01B 63/00* (2006.01)

(52) U.S. Cl.
CPC ............ *A01B 63/26* (2013.01); *A01B 63/008* (2013.01); *A01B 63/166* (2013.01); *A01C 5/064* (2013.01); *A01C 7/203* (2013.01)

(58) Field of Classification Search
CPC ......... A01B 63/26; A01B 63/24; A01B 63/14; A01B 63/00; A01B 63/008; A01B 63/002; A01B 63/166; A01B 63/16; A01C 5/064; A01C 5/062; A01C 5/06; A01C 5/00; A01C 7/203; A01C 7/201; A01C 7/20; A01C 7/00
See application file for complete search history.

(56) References Cited

U.S. PATENT DOCUMENTS

| 5,081,942 A | 1/1992 | Clark et al. |
| 5,595,130 A | 1/1997 | Baugher et al. |
| 5,619,939 A | 4/1997 | Herman et al. |
| 6,148,747 A | 11/2000 | Deckler et al. |
| 6,386,127 B1 | 5/2002 | Prairie et al. |

(Continued)

FOREIGN PATENT DOCUMENTS

EP 2220923 A1 8/2010

OTHER PUBLICATIONS

Crustbuster 4000 Series Owner's Manual, Crustbuster Speed King, Inc., 1999, 30 Pages. http://www.crustbuster.com/images/manuals/all-plant-drills/4000_Drill_1999_Pages_00-30.pdf.

*Primary Examiner* — Christopher J. Novosad
(74) *Attorney, Agent, or Firm* — Rebeca L. Henkel; Rickard K. DeMille

(57) ABSTRACT

A seed planting unit of an agricultural implement may include a wheel support arm having an upper portion and a lower portion, the upper portion defining a depth adjustment slot. A wheel may be rotatably supported by the lower portion of the wheel support arm, the wheel configured to contact the soil surface to define a penetration depth setting for the ground engaging tool relative to the soil surface. A depth adjustment lever is selectively movable relative to the wheel support arm to vary the penetration depth setting for the ground engaging tool. The lever may include a guide pin that is configured to be received within the depth adjustment slot, the guide pin configured to move within the depth adjustment slot as the depth adjustment lever is moved relative to the wheel support arm to adjust a vertical position of the wheel relative to the ground engaging tool.

13 Claims, 9 Drawing Sheets

(56) References Cited

U.S. PATENT DOCUMENTS

| | | | |
|---|---|---|---|
| 6,659,193 | B1 | 12/2003 | Best et al. |
| 6,983,705 | B1 | 1/2006 | Gust |
| 7,481,278 | B1 | 1/2009 | Pomedli et al. |
| 7,946,232 | B2 | 5/2011 | Patwardhan et al. |
| 8,186,287 | B2 | 5/2012 | Schilling et al. |
| 8,342,258 | B2 | 1/2013 | Ryder et al. |
| 8,672,047 | B2 | 3/2014 | Schilling |
| 9,179,593 | B2 | 11/2015 | Anderson et al. |
| 9,357,692 | B2 | 6/2016 | Johnson et al. |

SEED PLANTING UNIT OF AN AGRICULTURAL IMPLEMENT

FIELD OF THE INVENTION

The present subject matter relates generally to agricultural implements, and more specifically, to a seed planting unit of an agricultural implement.

BACKGROUND OF THE INVENTION

Generally, agricultural seed planting units are towed behind a tractor or other work vehicle via a mounting bracket secured to a rigid frame of an agricultural implement, such as a planter or seeder. These seed planting units typically include a ground engaging tool or opener that forms a furrow seed planting trench for seed deposition into the soil. Specifically, the opener is used to break the soil to enable seed deposition. After the seed is deposited, the opener is followed by a packer wheel that packs the soil on top of the deposited seed. The packer wheel also serves to adjust the penetration depth of the opener within the soil. In certain configurations, the penetration depth of the opener is adjustable by varying a vertical position of the packer wheel relative to the opener.

In typical configurations, the packer wheel is pivotally coupled to a packer support structure by a packer arm. Rotation of the packer arm relative to the packer support structure varies the vertical position of the packer wheel, thereby, in turn, adjusting the penetration depth of the opener. In certain configurations, the packer arm includes a series of openings configured to receive a fastener. The openings are positioned such that the angle of the packer arm relative to the packer support structure may be varied by securing the fastener to a particular opening. However, removing the fastener from one opening, rotating the packer arm relative to the packer support structure, and securing the fastener within another opening is a time consuming process. Furthermore, certain agricultural implements have multiple seed planting units, and therefore have multiple openers (e.g., greater than 50, 60, 70, 80, 90, or more). Because the openers are typically configured to maintain the same penetration depth setting, the duration of the depth adjustment process is multiplied by the number of openers coupled to the implement. Consequently, reconfiguration of the implement for a different penetration depth setting may result in large delays in seeding operations, thereby decreasing seeding efficiency.

Accordingly, a seed planting unit for use within an agricultural implement that allows for more efficient reconfiguration of the depth settings of the implement's openers would be welcomed in the technology.

BRIEF DESCRIPTION OF THE INVENTION

Aspects and advantages of the invention will be set forth in part in the following description, or may be obvious from the description, or may be learned through practice of the invention.

In one embodiment, the present subject matter is directed to a seed planting unit of an agricultural implement, with the seed planting unit generally including a ground engaging tool configured to penetrate a soil surface, a wheel support arm, and a wheel. The wheel support arm may be coupled to a support structure of the seed planting unit and may include an upper portion and a lower portion, the upper portion defining a depth adjustment slot. The wheel may be rotatably supported by the lower portion of the wheel support arm and may be configured to contact the soil surface to define a penetration depth setting for the ground engaging tool relative to the soil surface. The seed planting unit may further include a depth adjustment lever configured to be selectively movable relative to the wheel support arm to vary the penetration depth setting for the ground engaging tool. The depth adjustment lever may generally include a guide pin extending outwardly therefrom that is configured to be received within the depth adjustment slot. Additionally, the guide pin may be further configured to move within the depth adjustment slot as the depth adjustment lever is moved relative to the wheel support arm to adjust a vertical position of the wheel relative to the ground engaging tool.

In another embodiment, the present subject matter is directed to an agricultural implement including a frame and a plurality of seed planting units supported by the frame, with the seed planting units being configured to deposit seeds within a field as the implement is being moved across the field. Each seed planting unit may generally include a ground engaging tool configured to penetrate a soil surface of the field, a wheel support arm, and a wheel. The wheel support arm may be coupled to a support structure of the seed planting unit and may generally include an upper portion and a lower portion, the upper portion defining a depth adjustment slot. The wheel may be rotatably supported by the lower portion of the wheel support arm and may be configured to contact the soil surface to define a penetration depth setting for the ground engaging tool relative to the soil surface. Each seed planting unit may further include a depth adjustment lever configured to be selectively movable relative to the wheel support arm to vary the penetration depth setting for the ground engaging tool. The depth adjustment lever may include a guide pin extending outwardly therefrom that may be configured to be received within the depth adjustment slot. The guide pin may be configured to move within the depth adjustment slot as the depth adjustment lever is moved relative to the wheel support arm to adjust a vertical position of the wheel relative to the ground engaging tool.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
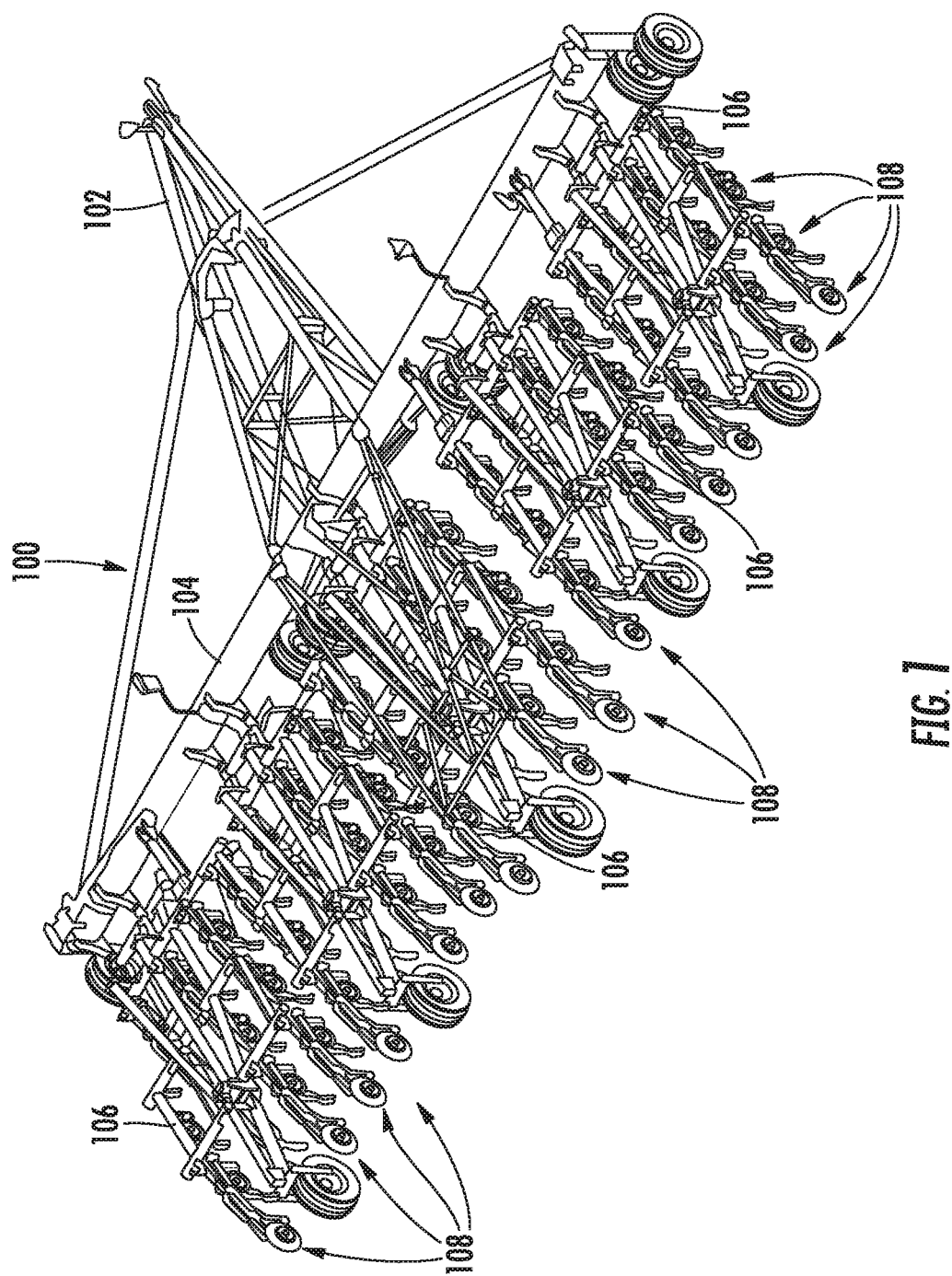
FIG. 1 illustrates a perspective view of one embodiment of an agricultural implement including multiple seed planting units in accordance with aspects of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a seed planting unit for an agricultural implement. In several embodiments, the implement may correspond to a planter or seeder and may include a plurality of seed planting units coupled to or otherwise supported by a frame of the planter/seeder. In one embodiment, each seed planting unit may include a ground engaging tool configured to open the soil surface to create a seed trench or furrow, and a wheel rotatably supported by a corresponding wheel support arm of the seed planting unit, with the wheel being configured to roll across or otherwise contact the soil surface to set a penetration depth of the ground engaging tool, as well as to close the seed trench upon deposition of seeds therein.

Additionally, in accordance with aspects of the present subject matter, each seed planting unit may be configured to allow a penetration depth setting for the ground engaging tool to be adjusted. Specifically, the seed planting unit may include one or more depth adjustment components configured to adjust the vertical position of the wheel relative to the ground engaging tool, which, in turn, may result in a corresponding adjustment in the penetration depth setting. As such, the depth adjustment components(s) may be used to set the desired penetration depth for the ground engaging tool based on, e.g., the soil composition or seed type, to allow for more efficient and/or effective seeding operations.

In several embodiments, the depth adjustment component (s) of the seed planting unit may include a depth adjustment lever configured to selectively rotate or pivot relative to the wheel support arm. As will be described below, the wheel support arm and the depth adjustment lever may include corresponding engagement elements, with the engagement elements of the depth adjustment lever being configured to engage with the engagement elements of the wheel support arm. For example, the depth adjustment lever may include a guide pin configured to be slideably or movably engaged in a generally arcuate-shaped depth adjustment slot of the wheel support arm such that pivotal movement of the lever relative to the wheel support arm results in the portion of the wheel support arm contacting the guide pin being raised or lowered, which, in turn, varies the depth adjustment setting for the ground engaging tool.

In one embodiment, the depth adjustment lever may further include a locking portion movable between an engaged position, where the locking portion is engaged with a generally arcuate-shaped, lever engagement slot of the wheel support arm, thereby allowing the position of the lever to be locked or otherwise maintained relative to the wheel support arm, and a disengaged position, where the locking portion of the lever is disengaged within the lever engagement slot relative to the wheel support arm, thereby allowing the position of the lever to be varied or otherwise adjusted relative to the wheel support arm (e.g., to adjust the penetration depth setting of the associated ground engaging tool). As will be described below, the lever engagement slot may, in several embodiments, include locking channels circumferentially spaced apart from one another to allow the lever to be locked relative to the wheel support arm in discrete angular increments, thereby permitting the penetration depth setting for the ground engaging tool to be similarly adjusted in incremental amounts corresponding to the circumferential offset between adjacent engagement elements.

It should be appreciated that, in accordance with aspects of the present subject matter, the position of the depth adjustment lever relative to the wheel support arm may be adjusted either manually or automatically to vary the depth penetration setting for the ground engaging tool. For instance, in one embodiment, an operator may be allowed to manually adjust the positioning of the depth adjustment lever (e.g., using an actuatable handle of the locking portion of the depth adjustment lever). In another embodiment, the seed planting unit may include an electronically controlled actuator coupled to the depth adjustment lever (e.g., a fluid-driven actuator). In such an embodiment, the actuator may be configured to be selectively controlled to actuate the depth adjustment lever so as to move the lever relative to the wheel support arm, thereby permitting the penetration depth setting for the ground engaging tool to be adjusted automatically.

Referring now to the drawings, FIG. 1 illustrates a perspective view of one embodiment of an agricultural implement 100. In general, the implement 100 is configured to be towed behind a work vehicle, such as a tractor (not shown). As shown in FIG. 1, the implement 100 may include a tow bar assembly 102, which is shown in the form of an A-frame hitch assembly. The tow bar assembly 102 may include a hitch configured to attach to an appropriate tractor hitch via a ball, clevis, or other coupling. Additionally, the tow bar assembly 102 may be coupled to a tool bar 104, which, in turn, supports multiple tool frames 106. Moreover, in several embodiments, each tool frame 106 may include multiple seed planting units 108, such as a plurality of hoe openers, coupled thereto or supported thereby. As discussed in detail below, each seed planting unit 108 may be configured to facilitate quick and efficient reconfiguration of the associated seed planting unit 108 for varying penetration depth settings in accordance with aspects of the present subject matter.

It should be appreciated that the configuration of the implement 100 described above and shown in FIG. 1 is provided only to place the present subject matter in an exemplary field of use. Thus, it should be appreciated that the present subject matter may be readily adaptable to any manner of implement configuration.

Figure 2:
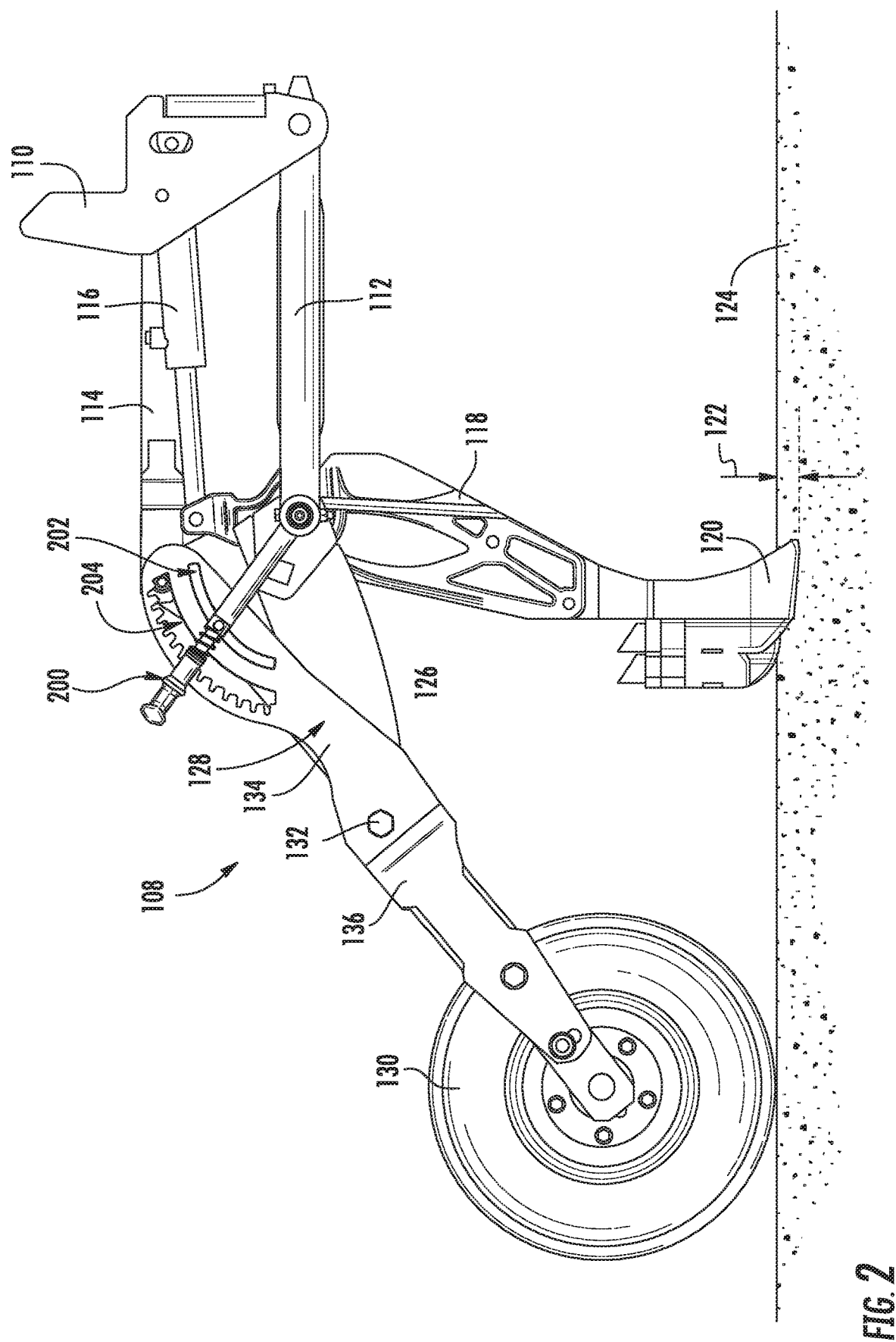
FIG. 2 illustrates a side view of one embodiment of a seed planting unit suitable for use within the agricultural implement shown in FIG. 1 in accordance with aspects of the present subject matter, particularly illustrating the seed planting unit including a support member, a ground engaging tool, a wheel support arm, a wheel, and a depth adjustment lever.

Referring now to FIG. 2, a side view of one embodiment of a seed planting unit 108 suitable for use within an agricultural implement (e.g., the implement 100 shown in FIG. 1) is illustrated in accordance with aspects of the present subject matter, particularly illustrating depth adjustment components or elements of the seed planting unit 108 configured to facilitate reconfiguration of the unit's penetration depth setting. It should be appreciated that, although the seed planting unit 108 is shown and described herein as corresponding to a hoe opener, the seed planting unit 108 may generally correspond to any suitable row unit having any suitable configuration that facilitates the deposition of seeds within the soil. Additionally, it should be appreciated that, although the seed planting unit 108 will generally be described in the context of the implement 100 shown in FIG. 1, the unit 108 may generally be configured to be installed on any suitable implement having any suitable implement configuration.

As shown in FIG. 2, the seed planting unit 108 includes a mounting bracket 110, a first linkage member 112, a second linkage member 114, and a biasing device or actuator, such as a cylinder 116 (e.g., hydraulic and/or pneumatic piston-cylinder assembly). In one embodiment, the cylinder 116 may be hydraulically coupled to a power supply that provides a flow of pressurized hydraulic fluid which displaces a piston rod extending from the cylinder. The mounting bracket 110 and associated hardware are generally configured to interface with the tool frame 106 (FIG. 1), thereby securing the seeding planting unit 108 to the implement 100 (FIG. 1). For instance, multiple seed planting units 108 may be mounted in parallel along the tool frame 106 (FIG. 1) to form a seeding assembly or unit. In the illustrated embodiment, the first linkage member 112, the second linkage member 114, and the mounting bracket 110 generally form elements of a parallel linkage, also known as a four bar linkage. As will be appreciated, components of the seed planting unit 108, such as the mounting bracket 110 (and associated hardware), first linkage member 112, and second linkage member 114, may be made of any suitable material, such as steel.

As shown in FIG. 2, the cylinder 116 may be attached to a shank 118 via a pin at the end of the piston rod. A ground engaging tool, such as the illustrated opener 120, is also attached to the shank 118 and is configured to engage the soil. Contact force between the opener 120 and the soil establishes a moment about a shank pivot joint. This moment is resisted by the force applied to the shank 118 by the cylinder 116. Furthermore, the linkage is configured to facilitate vertical movement of the implement 100, while maintaining the opener 120 at a desired penetration depth setting 122 within the soil 124. The desired penetration depth setting 122 may be selected based on soil conditions, or environmental factors, among other considerations. As illustrated, the linkage is coupled to a wheel support structure, such as the illustrated support structure 126.

A wheel support arm 128, including a packer wheel 130, is pivotally coupled to the support structure 126 by a pin 132 disposed through openings within the wheel support arm 128 and the support structure 126. The pin 132 is generally positioned at an interface between an upper portion 134 and a lower portion 136 of the wheel support arm 128. The packer wheel 130 is rotatably coupled to the lower portion 136 of the wheel support arm 128 and is configured to roll along or otherwise contact the soil surface to both pack the soil on top of deposited seeds and limit the penetration depth setting 122 of the opener 120. The pin 132 enables rotation of the wheel support arm 128 with respect to the support structure 126. However, in a working mode, rotation of the wheel support arm 128 relative to the support structure 126 is blocked by selective engagement of a depth adjustment lever 200 with the wheel support arm 128.

As discussed in detail below, the depth adjustment lever 200 is configured to be pivoted or otherwise moved relative to the wheel support arm 128 when it is desired to adjust the penetration depth setting 122 of the opener 120. Specifically, in several embodiments, the depth adjustment lever 200 (hereinafter referred to as "lever 200") is configured to be slidably or movably engaged within a depth adjustment slot 202 formed within the wheel support arm 128 such that movement of the lever 200 relative to the wheel support arm 128 results in the upper portion 134 of the wheel support arm 128 being raised or lowered, which, in turn, varies the vertical positioning of the opener 120 relative to the packer wheel 130, thereby altering the penetration depth setting of the opener 120. Once a desired penetration depth setting 122 has been established, the lever 200 may be locked into position relative to the wheel support arm 128, thereby limiting rotation of the wheel support arm 128 and enabling the seed planting unit 108 to enter the working mode. In one embodiment, the lever 200 may be configured to be locked in position relative to the wheel support arm by engaging features of a lever engagement slot 204 formed within the wheel support arm 128. As previously discussed, the packer wheel 130 rotates across a surface of the soil to limit or set the penetration depth setting 122 of the opener 120. Consequently, the difference in vertical position between the packer wheel 130 and the opener 120 defines the penetration depth setting 122 of the opener 120 within the soil 124.

Figure 3:
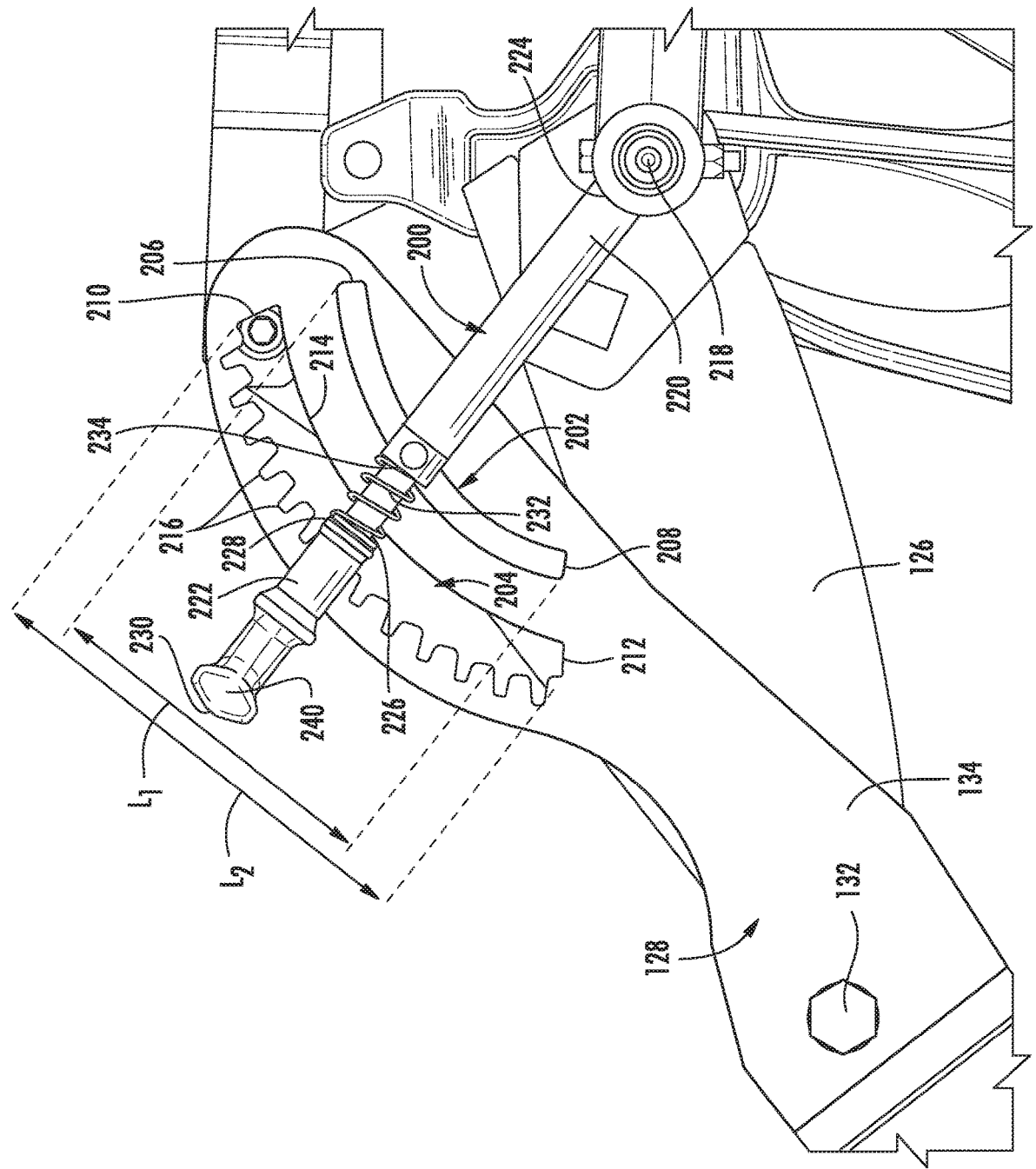
FIG. 3 illustrates a partial, side view of the seed planting unit shown in FIG. 2, particularly illustrating aspects of the depth adjustment lever and the wheel support arm of the seed planting unit in accordance with aspects of the present subject matter.
Figure 4:
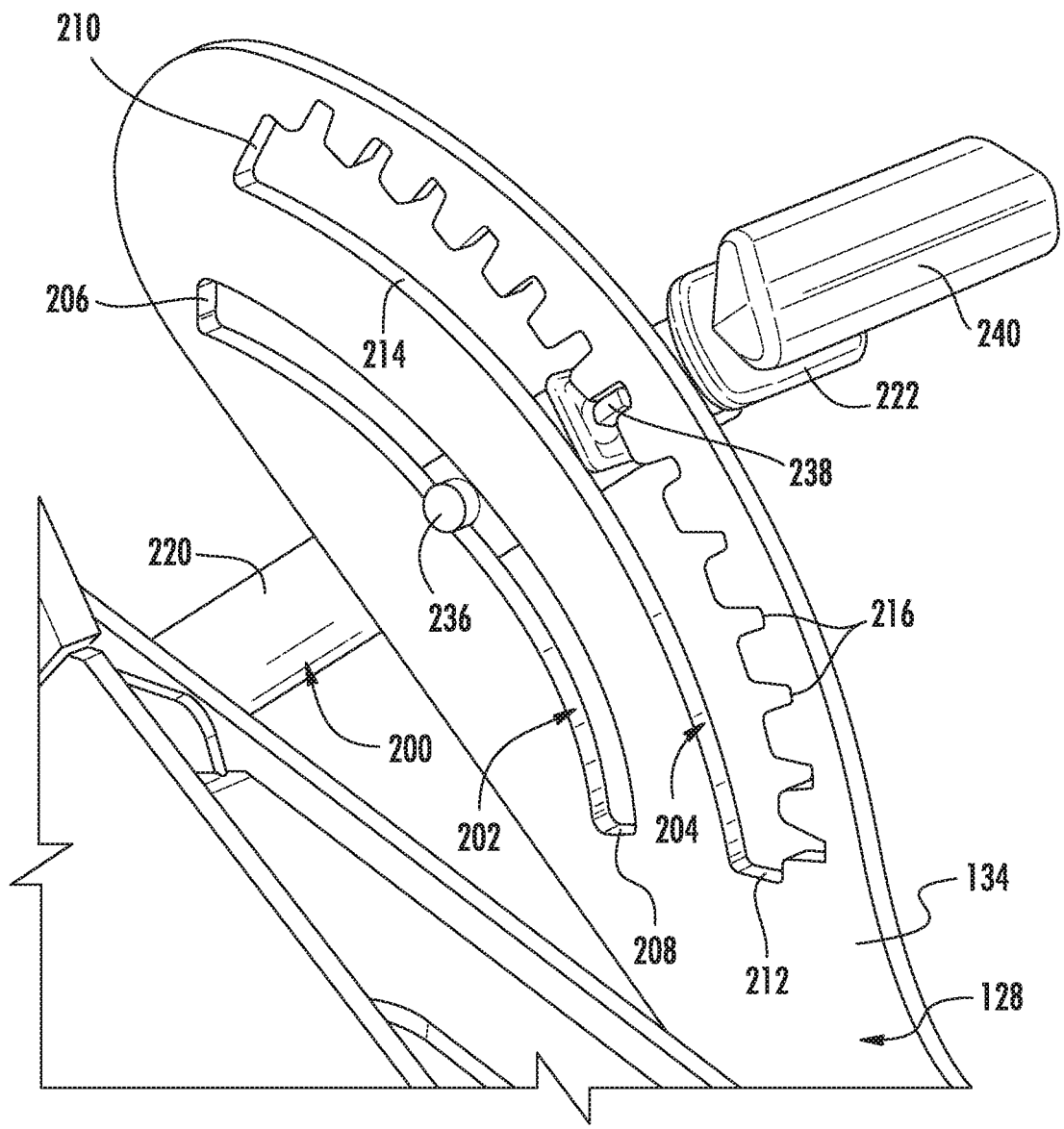
FIG. 4 illustrates a perspective view of portions of the depth adjustment lever and the wheel support arm shown in FIG. 3, particularly illustrating a perspective view of the opposed side of the wheel support arm than that shown in FIG. 3 to illustrate aspects of the engagement between the depth adjustment lever and the wheel support arm in accordance with aspects of the present subject matter.
Figure 5:
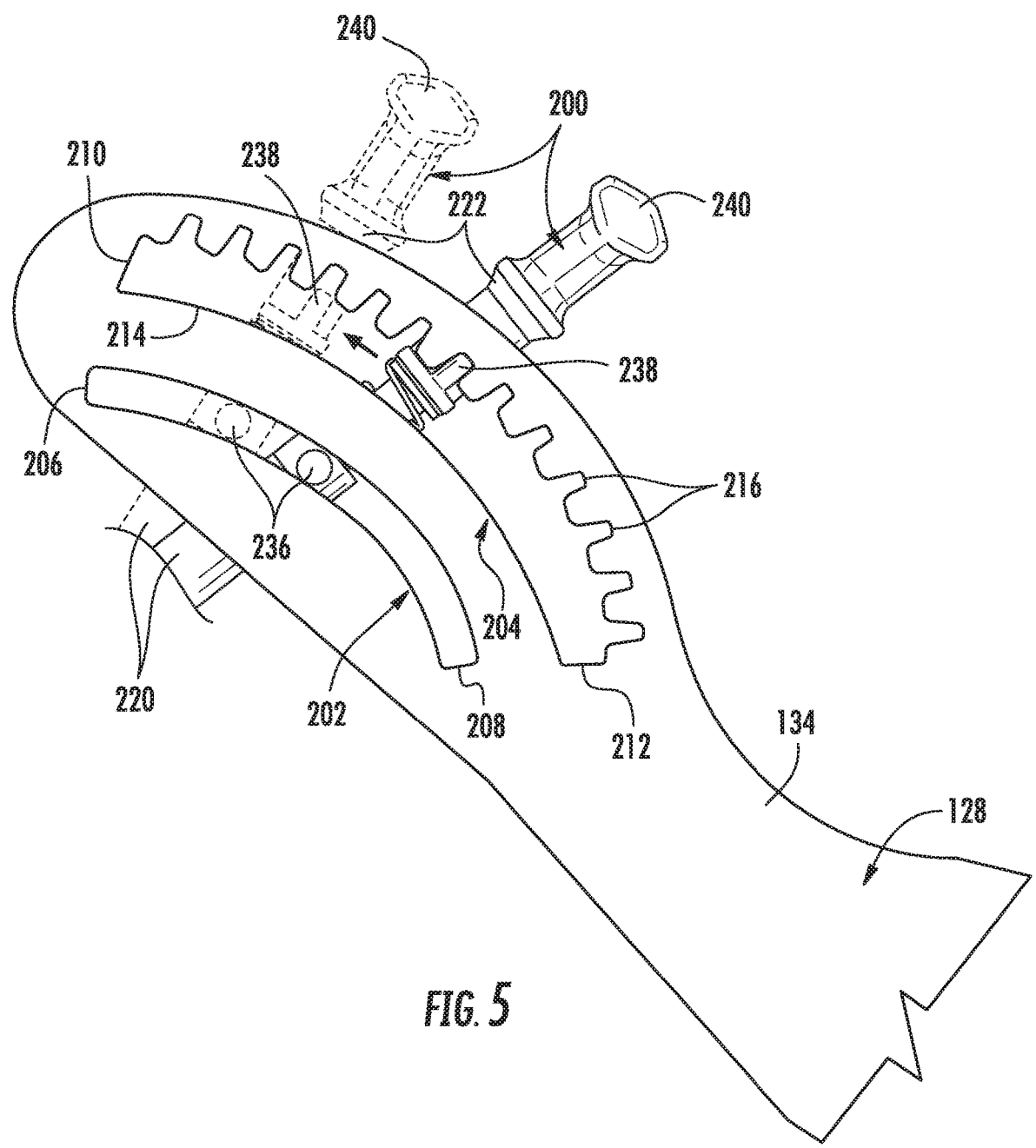
FIG. 5 illustrates a side view of the depth adjustment lever and the wheel support arm as viewed from the same side as that shown in FIG. 4, particularly illustrating the depth adjustment lever in both an engaged position (solid lines) and a disengaged position (dashed lines) relative to the wheel support arm in accordance with aspects of the present subject matter.
Figure 6:
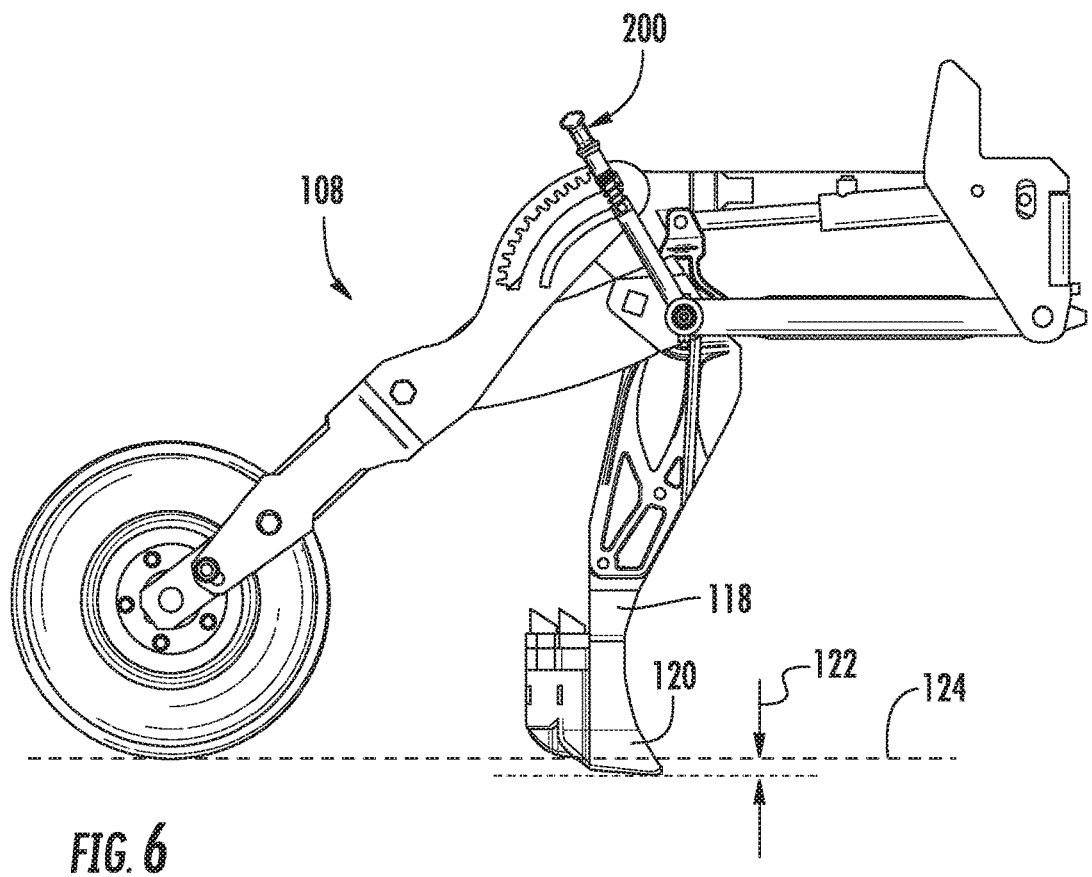
FIG. 6 illustrates a side view of the seed planting unit shown in FIG. 2, particularly illustrating the depth adjustment lever positioned relative to the wheel support arm such that the ground engaging tool is disposed at its minimum penetration depth setting.
Figure 7:
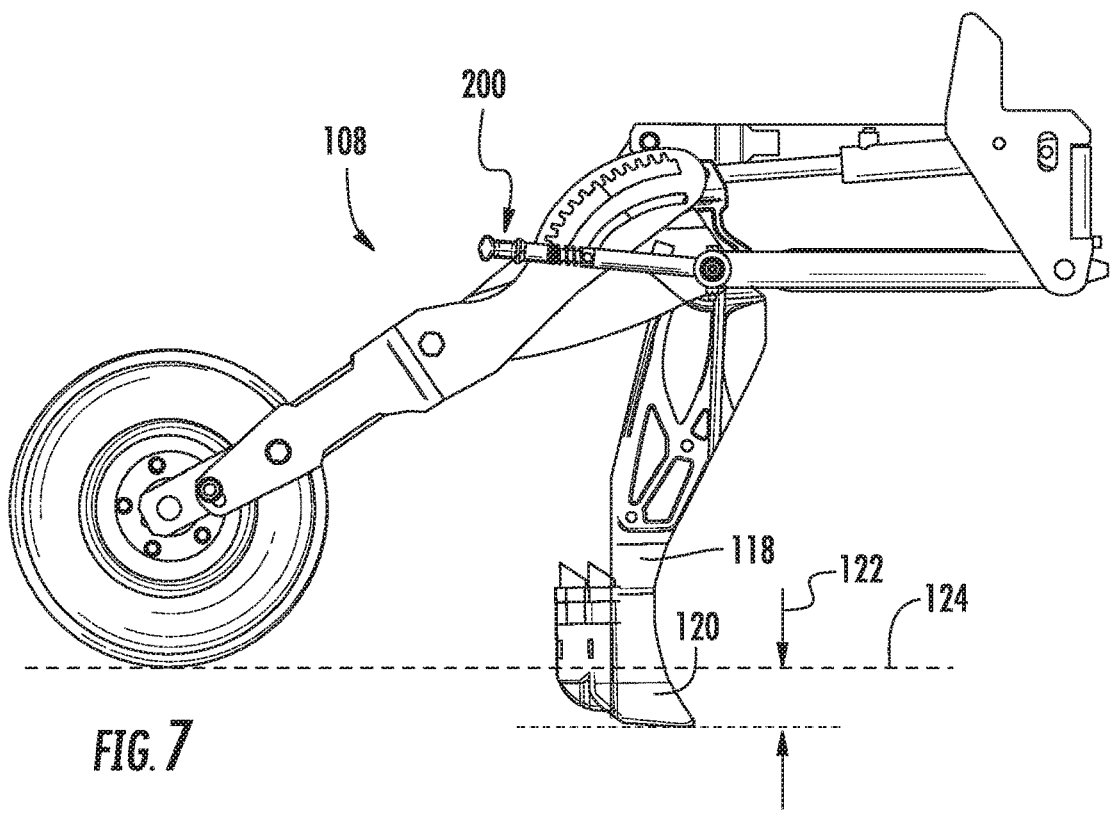
FIG. 7 illustrates another side view of the seed planting unit shown in FIG. 2, particularly illustrating the depth adjustment lever positioned relative to the wheel support arm such that the ground engaging tool is disposed at its maximum penetration depth setting.

Referring now to FIGS. 3-7, various views of one embodiment of a seed planting unit (e.g. the unit 108 shown in FIG. 2) are illustrated in accordance with aspects of the present subject matter. Specifically, FIG. 3 illustrates a partial, side view of unit 108 described above with reference to FIG. 2, particularly showing the lever 200 positioned relative to the depth adjustment slot 202 and the lever engagement slot 204 of the wheel support arm 128. FIG. 4 illustrates a partial, perspective view of the lever 200 and the wheel support arm 128 from the opposed side of the wheel support arm 128 as that shown in FIG. 3, particularly illustrating features or components of the lever 200 engaged with the depth adjustment slot 202 and the lever engagement slot 204 of the wheel support arm 128. FIG. 5 illustrates a partial, side view of the lever 200 and the wheel support arm 128 shown in FIG. 4, particularly illustrating the lever 200 in an engaged position (solid lines) and in a disengaged position (dashed lines) relative to the wheel support arm 128. Additionally, FIGS. 6 and 7 illustrate side views of the seed planting unit 108 shown in FIG. 3, particularly illustrating the lever 200 positioned at a minimum depth setting corresponding to a shallowest penetration depth setting of the opener 120 (FIG. 6) and at a maximum depth setting corresponding to a deepest penetration depth setting of the opener 120 (FIG. 7).

As shown in FIGS. 3-7, the lever 200 of the seed planting unit 108 is generally configured to engage the wheel support arm 128 via the depth adjustment slot 202 and the lever engagement slot 204 defined thereby. As previously discussed, pivotal movement of the lever 200 relative to the wheel support arm 128 may result in the upper portion 134 of the wheel support arm 128 being raised or lowered and the lower portion 136 of the wheel support arm 128 being consequently lowered or raised, respectively, which, in turn, varies the vertical positioning of the opener 120 (FIG. 2) relative to the packer wheel 130 (FIG. 2) and, thus, adjusts the penetration depth setting 122 of the opener 120. Additionally, as will be described in greater detail below, the lever 200 may be configured to be selectively engaged with or otherwise locked relative to the wheel support arm 128 to prevent further relative pivotal movement of the lever 200, thereby setting the desired penetration depth for the opener 120. In this regard, the selective engagement between the lever 200 and the wheel support arm 128 may be based, at least in part, on the relative position of at least one locking feature or portion of the lever 200 relative to the lever engagement slot 204. For example, the lever 200 may have a locking feature or portion configured to be moved relative to the lever engagement slot 204 between a disengaged position, at which the lever 200 may be freely moved relative to the wheel support arm 128 to adjust the penetration depth setting 122 of the opener 120, and an engaged position, at which the lever 200 is prevented from moving relative to the wheel support arm 128.

As particularly shown in FIGS. 3 and 4, the depth adjustment slot 202 and the lever engagement slot 204 generally correspond to openings or features formed within or defined through the upper portion 134 of the wheel support arm 128. The depth adjustment slot 202 extends in a generally arcuate manner along a length L1 defined between a first slot end 206 and a second slot end 208, with the first slot end 206 corresponding to the penetration depth setting 122 of the opener 120 where the opener 120 penetrates a minimum depth into the soil 124 (FIG. 6) and the second slot end 208 corresponding to the penetration depth setting 122 of the opener 120 where the opener 120 penetrates a maximum depth into the soil 124 (FIG. 7). The lever engagement slot 204 may similarly extend in a generally arcuate manner, where the curvature of the lever engagement slot 204 generally corresponds to the curvature of the depth adjustment slot 202, along a length L2 between a first engagement slot end 210 and a second engagement slot end 212. The lever engagement slot 204 is positioned radially outwardly from the depth adjustment slot 202 such that the first engagement slot end 210 is generally positioned radially outwardly the first slot end 206, while the second engagement slot 212 is similarly positioned radially outwardly from the second slot end 208. Further, while the depth adjustment slot 202 and the lever engagement slot 204 are shown as extending through the wheel support arm 128, the slots 202, 204 may each alternatively be formed as grooves or channels extending only partially into the wheel support arm 128. As will be further described below, the lever engagement slot 204 may be configured to generally include a base adjustment channel 214 and a plurality of locking channels 216 spaced apart from one another along the base adjustment channel 214.

As shown in FIG. 3, the lever 200 may be configured to be installed relative to or otherwise supported by the support structure 126 of the seed planting unit 108. For example, the lever 200 may be configured to be pivotally coupled to a side of the support structure 126 such that the lever 200 is pivotable relative to the wheel support arm 128 about a pivot point 218. In several embodiments, the lever 200 may generally include a base portion 220 and a locking portion 222. The base portion 220 may generally extend lengthwise between a first base end 224 and a second base end 226, with the lever 200 being pivotally coupled to the side of the support structure 126 at the first base end 224 of the base portion 220.

Additionally, the locking portion 222 of the lever 200 may be configured to be slidably coupled to or received on the base portion 220 such that the locking portion 222 may extend around or overlap at least a portion of the base portion 220 at its second base end 226. As shown in FIG. 3, the locking portion 222 may generally extend lengthwise between a first locking end 228 and a second locking end 230, with the first locking end 228 being positioned closer to the second base end 226 of the base portion 220 than the second locking end 230. Moreover, in one embodiment, the locking portion 222 is configured to be biased away from the first base end 224 of the lever 200, or more generally, towards the locking channels 216 of the lever engagement slot 204, by a biasing element. In the illustrated embodiment, the biasing element is shown as corresponding to a spring 232 compressed between the first locking end 228 of the locking portion 222 and a flange 234 defined by the base portion 220 between its first and second ends 224, 226. However, in other embodiments, any other biasing element suitable for applying a biasing force against the locking portion 222 may alternatively be used.

Additionally, as shown in the illustrated embodiment, the locking portion 222 of the lever 200 may, for example, include a handle 240, or other means for user interaction with the lever 200. In one embodiment, the handle 240 of the locking portion 222 is positioned proximate the second locking end 230 and is configured to allow the operator to effectively grasp the lever 200, thereby permitting the operator to manually adjust the position of the lever 200 relative to the wheel support arm 128. For example, as will be described below, the operator may be allowed to move or slide the locking portion 222 axially relative to the second base end 226 of the base portion 220 against the biasing force of the spring 232 from its engaged position to its disengaged position by applying an actuating force on the handle 240 to unlock the locking portion 222 relative to the wheel support arm 128 and the associated lever engagement slot 204.

As particularly shown in FIG. 4, the base portion 220 of the lever 200 may generally include a guide pin 236 coupled thereto that is configured to be received within the depth adjustment slot 202 of the wheel support arm 128. Specifically, in accordance with aspects of the present subject matter, the guide pin 236 is configured to be continuously received or maintained within the depth adjustment slot 202 such that the guide pin 236 is movable within the depth adjustment slot 202 when the lever 200 is pivoted or otherwise moved relative to the wheel support arm 128 to adjust a vertical position of the wheel 130 relative to the opener 120. In one embodiment, the guide pin 236 is rotationally fixed to the base portion 220 of the lever 200 such that the guide pin 236 is configured to slide within the depth adjustment slot 202. In another embodiment, the guide pin 236 is rotatably coupled to the base portion 220 of the lever 200 such that the guide pin 236 is configured to roll along the depth adjustment slot 202. In such an embodiment, asymmetrical wear of the guide pin 236 may be reduced, thus maintaining contact between the guide pin 236 and the depth adjustment slot 202 throughout an increased working life of the guide pin 236.

In addition, the lever 200 may further include an engagement or locking element 238 extending outwardly from its locking portion 222. In several embodiments, the locking element 238 is configured to be continuously received within the lever engagement slot 204 of the wheel support arm 128 and biased together with the locking portion 222 relative to the wheel support arm 128 between the associated engaged and disengaged positions for the lever 200. The locking element 238 may generally be shaped so as to allow the element 238 to be received within the locking channels 216 of the lever engagement slot 204. For example, as shown in the illustrated embodiment, the locking element 238 generally corresponds to a rectangular-shaped tab or projection extending outwardly from the locking portion 222 so as to allow the element 238 to be received within an associated locking channel 216 of the lever engagement slot 204.

As is particularly shown in FIG. 5, the locking element 238 is configured to be received within a selected one of the channels 216 of the lever engagement slot 204 to prevent pivotal movement of the lever 200 relative to the wheel support arm 128 when the locking portion 222 is disposed at its engaged position. As shown in the solid line depiction of the lever 200 in FIG. 5, the locking element 238 is normally in the engaged position when there are no outside forces acting on the handle 240 of the locking portion 222 against the biasing force supplied by the spring 232. When it is desired to change the penetration depth setting 122 of the opener 120, an actuating force is applied on the handle 240 of the locking portion 222, against the biasing force of the spring 232, such that the locking portion 222 and associated locking element 238 move together axially relative to the base portion 220 of the lever, thereby moving the locking element 238 out of its respective channel 216 and into the base adjustment channel 214 of the lever engagement slot 204. Once the locking element 238 is removed from the locking channel 216 and, thus, is moved into its disengaged position within the base adjustment channel 214 (e.g., as indicated by dashed lines in FIG. 5), the actuating force is continued to be applied to allow the lever 200 to be pivoted relative to the wheel support arm 128. Specifically, a rotational or pivoting force may be applied to the lever 200 to rotate the lever 200 and adjust the penetration depth setting 122 of the opener 120 to a desired position.

It should be appreciated that, an alternative to the configuration of the lever engagement slot 204 shown in the illustrated embodiment, the locking channels 216 may instead be located along the bottom of the slot 204, with the base adjustment channel 214 extending along the top of the slot 204. In such an embodiment, the biased configuration of the locking portion 222 of the lever 200 may be reversed, with the spring 232 being configured to bias or pull the locking portion 222 axially towards the first base end 224 of the lever 200, or more generally, towards the locking channels 216 disposed along the bottom side of the lever engagement slot 204. As such, to move the locking portion 222 to its disengaged position, the operator may be allowed to grasp the handle 240 and pull upwardly against the bias of the spring 232 to raise the locking element 238 out of its respective channel 216 and, thus, to allow the lever 200 to be pivoted relative to the wheel support arm 128.

It should also be appreciated that the lever 200 may generally be pivoted relative to the wheel support arm 128 along the length of the depth adjustment slot 202 defined between its first and second slot ends 206, 208. As such, the length L1 of the depth adjustment slot 202 may generally define the depth adjustment range of the penetration depth setting for the opener 120. For example, as particularly shown in FIGS. 6 and 7, when the lever 200 is pivoted relative to the wheel support arm 128 such that the guide pin 236 is located at the first slot end 206 of the depth adjustment slot 202, the opener 120 may be disposed at its minimum penetration depth setting 122. Similarly, when the lever 200 is pivoted relative to the wheel support arm 128 such that the guide pin 236 is located at the second slot end 208 of the depth adjustment slot 202, the opener 120 may be disposed at its maximum penetration depth setting 122. In this regard, rotation of the lever 200 relative to the wheel support arm 128 in a first direction (i.e., such that the guide pin 236 slides, rolls, or otherwise moves along the depth adjustment slot 202 away from the first slot end 206 and towards the second slot end 208) results in the penetration depth setting 122 being increased, while movement of the lever 200 relative to the wheel support arm 128 in the opposite direction (i.e., such that the guide pin 236 slides, rolls, or otherwise moves along the depth adjustment slot 202 away from the second slot end 208 and towards the first slot end 206) results in the penetration depth setting 122 being decreased. Such adjustments of the penetration depth setting 122 generally result from the arcuate shape of the depth adjustment slot 202, as well as the engagement between the guide pin 236 and the wheel support arm 128 via the depth adjustment slot 202. Specifically, as the guide pin 236 moves within the depth adjustment slot 202 towards the second slot end 208, the upper portion 134 of the wheel support arm 128 pivots downwardly, thereby resulting in the relative vertical positioning of the packer wheel 130 being raised so to increase the depth at which the opener 120 penetrates the soil. In contrast, as the guide pin 236 moves within the depth adjustment slot 202 towards the first slot end 206, the upper portion 134 of the wheel support arm 128 pivots upwardly, thereby resulting in the relative vertical positioning of the packer wheel 130 being lowered so to decrease the depth at which the opener 120 penetrates the soil. It should be appreciated that, when the desired position of the lever 200 relative to the wheel support arm 128 is reached, the axially oriented actuating force may be removed from the handle 240 to allow the spring 232 to bias the locking portion 222 back into its engaged position such that the locking element 238 is received within the adjacent locking channel 216 of the lever engagement slot 204 to prevent further movement of the lever 200 relative to the wheel support arm 128.

Figure 8:
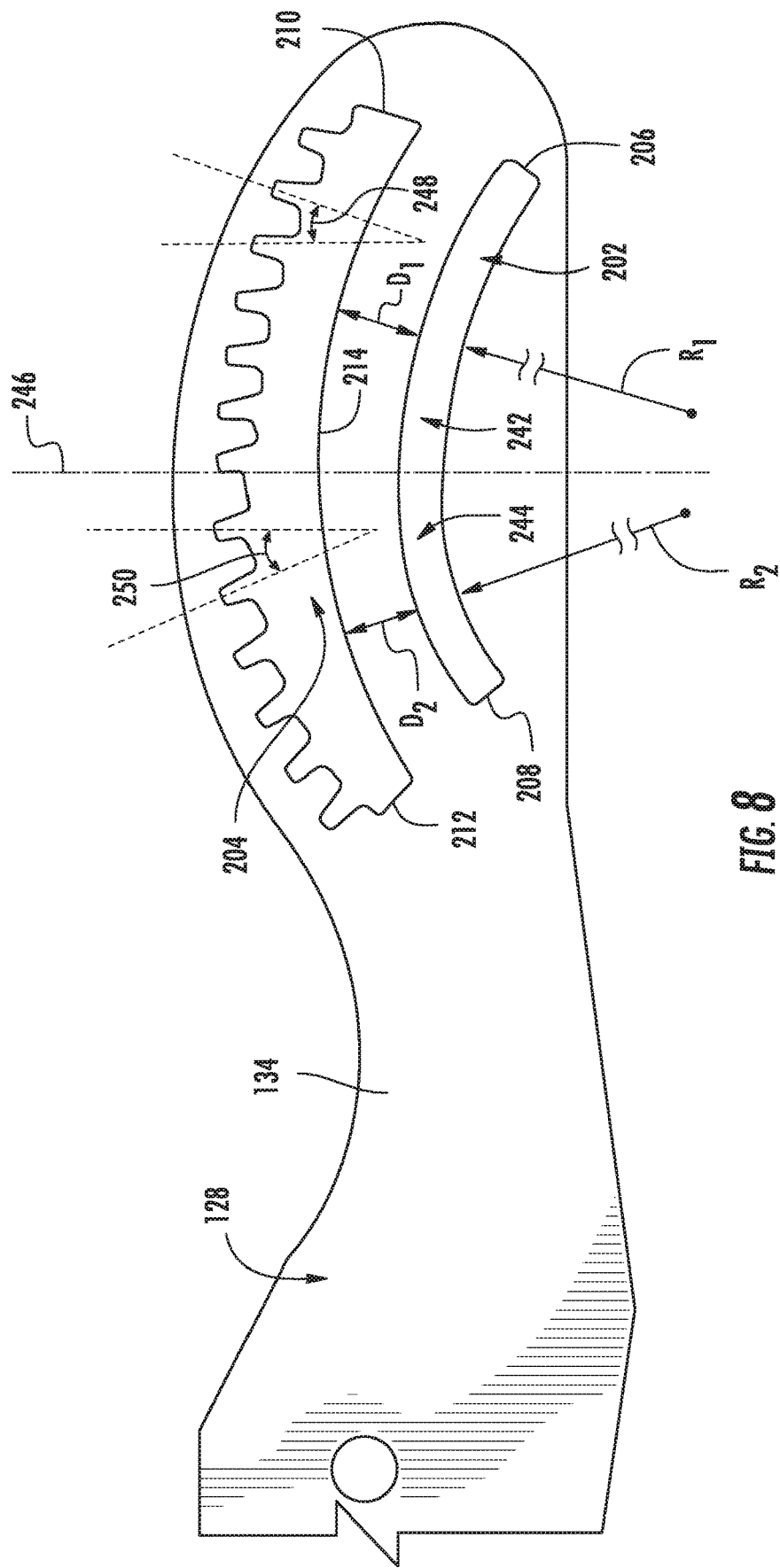
FIG. 8 illustrates a side view of a portion of the wheel support arm shown in FIG. 3, particularly illustrating aspects of a depth adjustment slot and a lever engagement slot of the wheel support arm in accordance with aspects of the present subject matter.

Referring now to FIG. 8, a side view of the upper portion 134 of the wheel support arm 128 described above with reference to FIGS. 3-7 is illustrated in accordance with aspects of the present subject matter. As shown in FIG. 8, in several embodiments, both the depth adjustment slot 202 and the lever engagement slot 204 may have a profile and/or configuration that differs at one or locations along the length of each slot 202, 204. For example, in one embodiment, the slots 202, 204 may have a first profile and/or configuration along a first arcuate section 242 of each slot 202, 204 and a second profile and/or configuration along a second arcuate section 244 of each slot 202, 204, with the first and second arcuate sections 242, 244 being defined relative to a reference transition line 246. Specifically, as shown in FIG. 8, the first arcuate section 242 of the depth adjustment slot 202 extends from its first slot end 206 to the transition line 246 while the second arcuate section 244 of the depth adjustment slot 202 extends from the transition line 246 to its second slot end 208. Similarly, the first arcuate section 242 of the lever engagement slot 204 extends from its first engagement slot end 210 to the transition line 246 while the second arcuate section 244 of the lever engagement slot 204 extends from the transition line 246 to its second engagement slot end 212.

In one embodiment, the depth adjustment slot 202 may define a first radius of curvature R1 as it extends along the first arcuate section 242 and a second radius of curvature R2 as it extends along the second arcuate section 244. In the illustrated embodiment, the first radius of curvature R1 is shown as being larger than the second radius of curvature R2. With such a configuration, rotation of the lever 200 across a given angular portion of the first arcuate section 242 would cause a change in the penetration depth setting 122 that is more gradual than movement of the lever 200 across the same angular portion of the second arcuate section 244. However, in an alternative embodiment, the first radius of curvature R1 may be smaller than the second radius of curvature R2, in which case rotation of the lever through a given angular portion of the first arcuate section 242 would cause the change in penetration depth setting 122 to be steeper than similar movement of the lever across the second arcuate section 244.

Additionally, as shown in the illustrated embodiment, the lever engagement slot 204 is spaced apart from the depth adjustment slot 202 by a first radial distance D1 across the first arcuate sections 242 and by a second radial distance D2 across the second arcuate sections 244. As shown in FIG. 8, the first radial distance D1 is slightly larger than the second radial distance D2. However, in an alternative embodiment, the first radial distance D1 may be smaller than or equal to the second radial distance D2. Moreover, in several embodiments, the locking channels 216 of the lever engagement slot 204 may be circumferentially spaced apart from one another by a first circumferential offset 248 across the first arcuate section 242 and by a second circumferential offset 250 across the second arcuate section 244. As shown in FIG. 8, the first circumferential offset 248 is smaller than the second circumferential offset 250. As such, a smaller or more granular incremental adjustment of the position of the lever 200 relative to the wheel support arm 128 may be made within the first arcuate section 242 than in the second arcuate section 244. However, in an alternative embodiment, the first circumferential offset 248 may be larger than or equal to the second circumferential offset 250.

It should be appreciated that, by configuring the slots 202, 204 to have multiple arcuate sections (i.e., the first arcuate sections 242 and the second arcuate sections 244 shown in FIG. 8), adjustment of the penetration depth setting 122 may be configured to provide more fine or gradual changes within certain ranges (e.g., shallower ranges) of the opener's penetration depth that may require more precise positioning of the seed within the soil 124 and coarser or larger changes within other ranges (e.g., deeper ranges) of the opener's penetration depth where less precise positioning of the seed within the soil 124 is required.

It should also be appreciated that, in alternative embodiments, the slots 202, 204 may be configured such that the radii R1, R2 are equal, the radial distances D1, D2 are equal, and/or the channels 216 of the lever engagement slot 204 are evenly spaced apart such that the circumferential offsets 248, 250 are equal. In such a way, the penetration depth setting 122 may be configured to be adjusted in equal increments between the maximum and minimum settings and the complexity of manufacturing the upper portion 134 of the wheel support arm 128 may be reduced, thereby reducing the associated costs of manufacturing.

Figure 9:
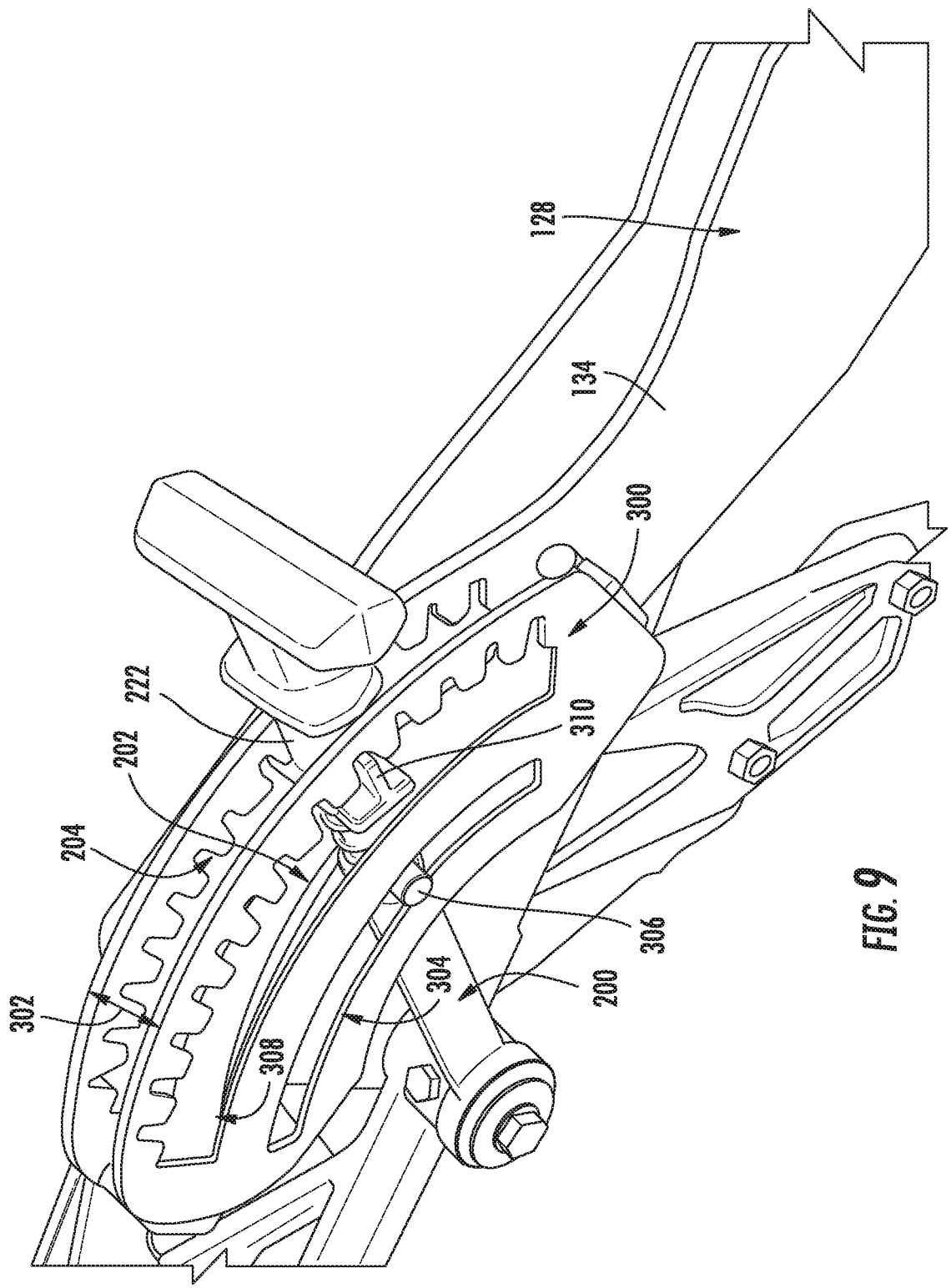
FIG. 9 illustrates a partial, perspective view of another embodiment of the seed planting unit shown in FIG. 2, particularly illustrating the seed planting unit including an adjustment support plate configured to engage the depth adjustment lever in accordance with aspects of the present subject matter.

Referring now to FIG. 9, a perspective view of another embodiment of the seed planting unit described above is illustrated in accordance with aspects of the present subject matter. Specifically, FIG. 9 illustrates an embodiment in which an additional adjustment support plate 300 has been mounted to the upper portion 134 of the wheel support arm 128. It should be appreciated that, except for the adjustment support plate 300, the upper portion 134 of the wheel support arm 128 shown in FIG. 9 may otherwise be configured the same as or similar to that described above with reference to FIGS. 3-8. Thus, for the sake of brevity, the description of the upper portion 134 of the wheel support arm 128 shown in FIG. 9 will be limited to the various features of the adjustment support plate 300 and its interaction with the lever 200.

As shown in FIG. 9, the adjustment support plate 300 is configured to be mounted to the upper portion 134 of the wheel support arm 128 such that a gap 302 is defined between the wheel support arm 128 and the adjustment support plate 300 for receiving the lever 200 therebetween. In several embodiments, the adjustment support plate 300 (hereinafter referred to as "support plate 300") may be configured to include complementary or similar slots to those described above with reference to the wheel support arm 128. For example, as shown in FIG. 9, the support plate 300 may include a second depth adjustment slot 304 that is generally configured the same as or similar to the depth adjustment slot 202 formed in the wheel support arm 128. In such an embodiment, the support plate 300 may be configured to installed relative to the wheel support arm 120 so that the second depth adjustment slot 304 is generally aligned with the depth adjustment slot 202 defined by the wheel support arm 128, thereby allowing corresponding guide pins to be slidably or movably received within each of the slots 202, 304. For example, as shown in the illustrated embodiment, the lever 200 may include a second guide pin 306 extending outwardly therefrom along an opposite side of the lever 200 as the guide pin (not shown) configured to be received within the depth adjustment slot 202. In such an embodiment, the second guide pin 306 may be configured to be movable within the second depth adjustment slot 304 of the support plate 300 in the same manner as the guide pin 242 within the depth adjustment slot 202 as the lever 202 is pivoted relative to both the wheel support arm 128 and the support plate 300.

Additionally, as shown in FIG. 9, the adjustment support plate 300 may include a second lever engagement slot 308 that is generally configured the same as or similar to the lever engagement slot 204 of the wheel support arm 128. In such an embodiment, the support plate 300 may be configured to installed relative to the wheel support arm 120 so that the second lever engagement slot 308 is generally aligned with the lever engagement slot 204 defined by the wheel support arm 128, thereby allowing corresponding engagement or locking elements to be received within each of the slots 308, 204. For example, as shown in FIG. 9, the locking portion 222 of the lever 200 may include a second locking element 310 extending outwardly therefrom along an opposite side of the lever 200 as the locking element (not shown) configured to be received within the lever engagement slot 204. In such an embodiment, the second locking element 310 may be configured to be received within the second lever engagement slot 308 such that, when the locking portion 222 is biased into its engaged position, the locking element 310 is received within a corresponding locking channel of the second lever engagement slot 308.

By configuring the seed planting unit 108 to include the adjustment support plate 300 as described with reference to FIG. 9, the lever 200 may be retained or trapped between the wheel support arm 128 and the support plate 300 when moving the locking portion 222 of the lever 200 axially between its engaged and disengaged positions and further when rotating the lever 200 relative to the wheel support arm 128. In such an embodiment, the wear on the rotational coupling between the lever 200 and the wheel support arm 128 may be reduced, allowing for a longer and more reliable usable life. Further, the lever 200 may be restrained from accidental disengagement due to vibrations during operation of the seed planting unit 108, thus improving the reliability of the locking portion 222 and guide pin(s) 242, 306 in maintaining the rotational position of the lever 200 relative to the wheel support arm 128.

Figure 10:
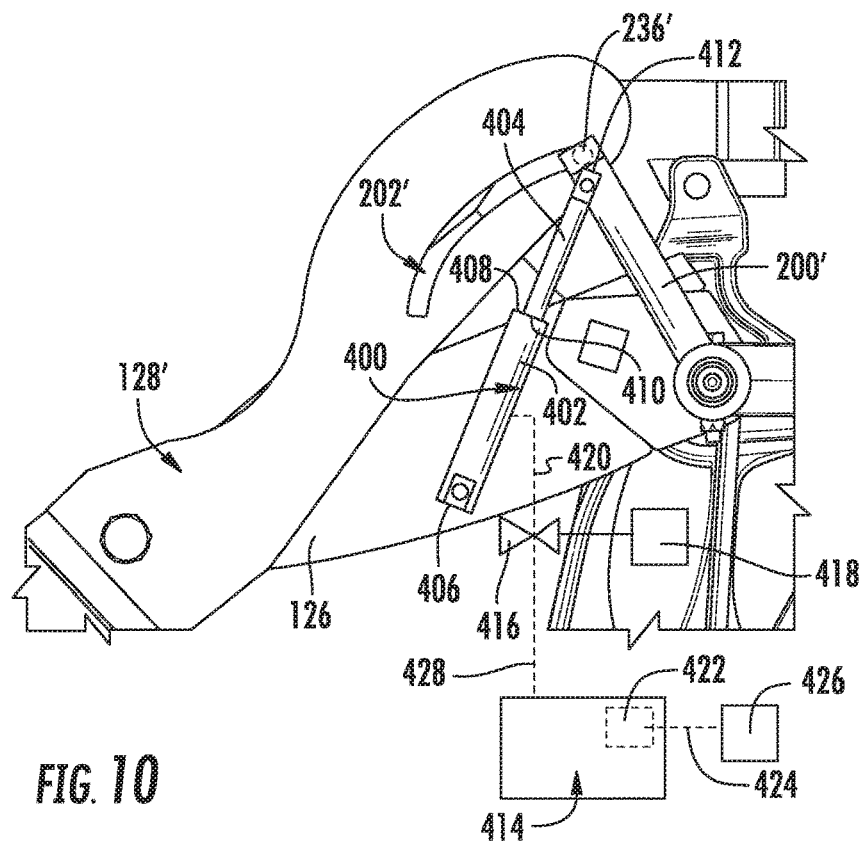
FIG. 10 illustrates a partial, side view of another embodiment of the seed planting unit shown in FIG. 2, particularly illustrating the seed planting unit including an actuator configured to adjust the position of the depth adjustment lever relative to the wheel support arm in accordance with aspects of the present subject matter.

Referring now to FIG. 10, a partial, perspective view of a further embodiment of the seed planting unit 108 described above is illustrated in accordance with aspects of the present subject matter. Specifically, FIG. 10 illustrates an alternate embodiment of the seed planting unit 108 having an alternate wheel support arm 128', an alternate depth adjustment lever 200', and an actuator 400 configured for automatic adjustment of the penetration depth setting 122 of the opener 120. As discussed in detail below, the depth adjustment lever 200' is configured to be pivoted or otherwise moved by the actuator 400 relative to the wheel support arm 128' when it is desired to adjust the penetration depth setting 122 of the opener 120. Further, the depth adjustment lever 200' may be configured to be selectively locked relative to the wheel support arm 128' by the actuator 400 to prevent further relative pivotal movement of the alternate depth adjustment lever 200', thereby setting the desired penetration depth for the opener 120.

In the illustrated embodiment, the wheel support arm 128' is generally configured the same as or similar to the wheel support arm 128 described above with reference to the embodiments shown in FIGS. 3-9. However, unlike the wheel support arm 128 described above that includes both a depth adjustment slot 204 and a lever adjustment slot 204, the wheel support arm 128' only includes a depth adjustment slot 202' (e.g., configured the same as or similar to the depth adjustment slot 202 described above). In such an embodiment, the lever 200' may similarly be reconfigured as compared to the lever 200 described above with reference to FIGS. 3-9. For example, unlike the lever 200 described above that includes both a base portion 222 and a locking portion 224, the lever 200' only includes a base portion 220' having a guide pin 236' configured to be movably received within the depth adjustment slot 202'. As such, the lever 200' may be to be selectively rotated relative to the wheel support arm 128' by the actuator 400 to slide or roll the guide pin 236' along the depth adjustment slot 202' to adjust the penetration depth setting of the opener 120.

As shown in FIG. 10, the actuator 400 includes a base cylinder 402 and an actuating arm 404. The base cylinder 402 extends between a first cylinder end 406 and a second cylinder end 408, with the actuator 400 being rotatably mounted to the support structure 126 of the seed planting unit 108 at the first cylinder end 406. Additionally, the actuating arm 404 generally extends between a first arm end 410 and a second arm end 412, with the first arm end 410 being receivable within the base cylinder 402 and the second arm end 412 being rotatably coupled to the lever 200' generally adjacent the guide pin 242'. As such, movement of the actuating arm 404 relative to the base cylinder 402 causes the guide pin 242' to slide or roll within the depth adjustment slot 202' such that the wheel support arm 128' rotates to adjust the penetration depth setting of the opener 120.

In several embodiments, the operation of the actuator 400 may be electronically controlled via a controller 414, such as any suitable processor-based device(s) having a processor and a memory configured to store computer-readable instructions that can be executed by the processor. In such an embodiment, the controller 414 may be configured to control the operation of one or more components that regulate the actuation of the actuating arm 404 relative to the cylinder 402. For example, the controller may be communicatively coupled to one or more control valve(s) 416 configured to regulate the supply of fluid 418 (e.g., hydraulic fluid or air) to the actuator 400. In such instance, the control valve(s) may be fluidly connected to the actuator 400 through a hydraulic line(s) 420.

Moreover, the controller 414 may also include a communications interface 422 to provide a means for the controller 414 to communicate with any of the various other system components of the agricultural implement and/or any components of the work vehicle towing the implement. For instance, one or more communication links or interfaces 424 may be provided between the communications interface 422 and a user interface 426 to allow the controller to receive input signals from the user interface 426. The user interface 426 may be configured to receive information from the operator such as, but not limited to, information regarding the desired penetration depth setting for the opener 20, and to send input signals to the communications interface 422 via the communication link(s) 424. Similarly, one or more communicative links or interfaces 428 may be provided between the communications interface 422 and the actuator (s) 400 (and/or a related component configured to control the operation of the actuator(s) 400, such as a related control valve(s) 416) to allow the operation of the actuator(s) 400 to be controlled by the controller 414.

Figure 11:
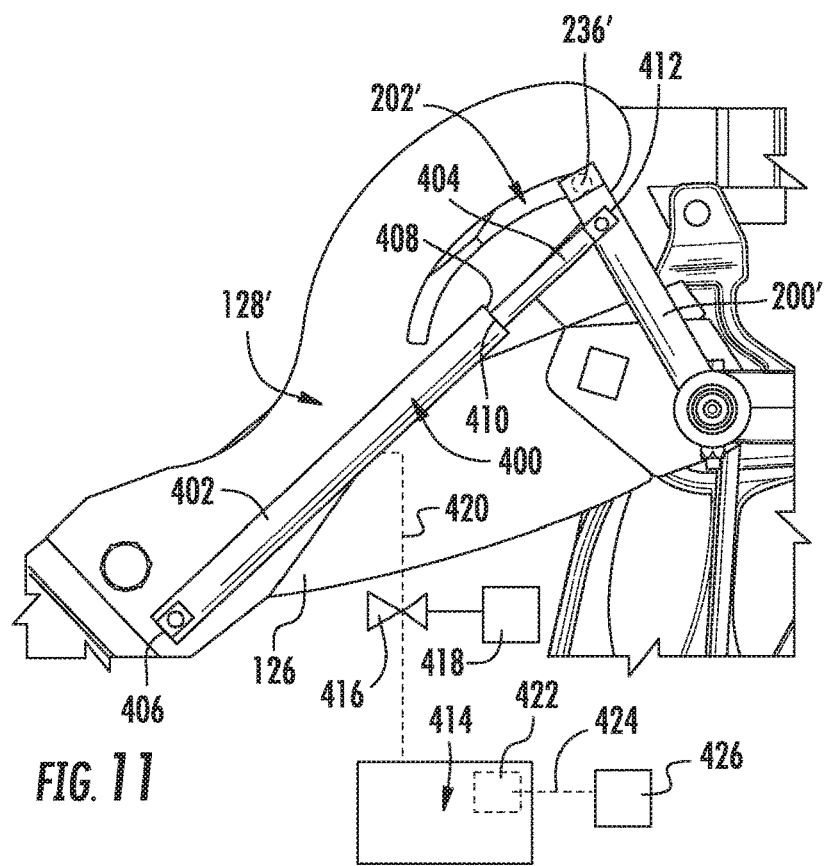
FIG. 11 illustrates a partial, side view of an alternative embodiment of the seed planting unit shown in FIG. 10, particularly illustrating the actuator coupled to the wheel support arm as opposed to the support member of the seed planting unit in accordance with aspects of the present subject matter.

Referring now to FIG. 11, an alternative embodiment of the seed planting unit described above with reference to FIG. 10 is illustrated in accordance with aspects of the present subject matter. The embodiment of FIG. 11 only differs from the embodiment shown in FIG. 10 in that the actuator 400 is shown as being coupled at its first cylinder end 406 to the wheel support arm 128' instead of to the support structure 126. However, it should be appreciated that, in general, the actuator 400 may be coupled between the lever 200 and any other suitable component that allows the actuator 400 to function as described herein (e.g., to allow the actuator 400 to actuate the lever 200 relative to the wheel support arm 128').

By configuring the seed planting unit 108 to have an electronically controlled actuator, such as the actuator 400 described above with reference to FIGS. 10 and 11, the penetration depth of the seed planting unit 108 may be adjusted automatically (i.e., without manual manipulation of the lever 200'). In such a way, the time required to adjust the penetration depth may be reduced significantly, thus increasing seeding efficiency. For example, in instances in which each seeding 108 includes an associated actuator 400, the operator may provide an input (via the interface 426) instructing the controller 414 to control the operation of the various actuators 400 such that the penetration depth setting for each opener 20 of the implement is adjusted to a given operator-selected setting. In addition, by using the disclosed actuator 400, the penetration depth setting for each opener 20 may be infinitely variable between the opposed ends of the depth adjustment slot 202' (e.g., as opposed to the discrete increments achieved using the lever engagement slot 204).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A seed planting unit of an agricultural implement, the seed planting unit comprising:
   a support structure;
   a ground engaging tool configured to penetrate a soil surface, the ground engaging tool connected to the support structure at a first pivot;
   a wheel support arm connected to the support structure at a second pivot, the wheel support arm including an upper portion and a lower portion, the upper portion defining a depth adjustment slot;
   a wheel rotatably supported by the lower portion of the wheel support arm, the wheel configured to contact the soil surface to define a penetration depth setting for the ground engaging tool relative to the soil surface; and
   a depth adjustment lever connected to the first pivot and configured to be selectively movable relative to the wheel support arm to vary the penetration depth setting for the ground engaging tool, the depth adjustment lever including a guide pin extending outwardly therefrom that is configured to be received within the depth adjustment slot, the guide pin configured to move within the depth adjustment slot as the depth adjustment lever is moved relative to the wheel support arm to adjust a vertical position of the wheel relative to the ground engaging tool.

2. The seed planting unit of claim 1, wherein the depth adjustment slot corresponds to an arced slot extending lengthwise between a first slot end and a second slot end, the guide pin configured to be positioned within the depth adjustment slot at the first slot end when the penetration depth setting for the ground engaging tool corresponds to a minimum depth setting and at the second slot end when the penetration depth setting for the ground engaging tool corresponds to a maximum depth setting.

3. The seed planting unit of claim 1, wherein the wheel support arm further defines a lever engagement slot separate from the depth adjustment slot, a locking portion of the depth adjustment lever configured to be selectively engaged with the lever engagement slot at one of a plurality of locking positions defined by the lever engagement slot to maintain a given position of the depth adjustment lever relative to the wheel support arm.

4. The seed planting unit of claim 3, wherein the locking portion of the depth adjustment lever is configured to be moved relative to a base portion of the depth adjustment lever between an engaged position, at which the locking portion is engaged with the lever engagement slot at one of the plurality of locking positions in order to maintain the position of the depth adjustment lever relative to the wheel support arm, and a disengaged position, at which the locking portion of the depth adjustment lever is disengaged relative to the lever engagement slot to allow the depth adjustment lever to be moved relative to the wheel support arm.

5. The seed planting unit of claim 4, wherein the locking portion of the depth adjustment lever is configured as a handle configured to be moved axially relative to the base portion of the depth adjustment lever between the engaged and disengaged positions.

6. The seed planting unit of claim 4, wherein the lever engagement slot is defined in the wheel support arm such that the lever engagement slot includes a base adjustment channel and a plurality of circumferentially spaced locking channels extending outwardly from the base adjustment channel, each locking channel defining a respective one of the plurality of locking positions of the lever engagement slot.

7. The seed planting unit of claim 6, wherein the locking portion of the depth adjustment lever includes an engagement element configured to be received within a selected locking channel of the plurality of circumferentially spaced locking channels when the locking portion of the depth adjustment lever is located at the engaged position, the engagement element configured to be moved out of the selected locking channel and into the base adjustment channel when the locking portion of the depth adjustment lever is located at iti at the disengaged position.

8. The seed planting unit of claim 6, wherein a circumferential offset between adjacent locking channels of the plurality of circumferentially spaced locking channels differs along a length of the lever engagement slot.

9. The seed planting unit of claim 3, further comprising a biasing element configured to apply a biasing force against the locking portion of the depth adjustment lever to bias the locking portion into engagement with the lever engagement slot at one of the plurality of locking positions.

10. The seed planting unit of claim 1, further comprising an actuator coupled to the depth adjustment lever, the actuator being configured to actuate the depth adjustment lever such that the depth adjustment lever is moved relative to the wheel support arm.

11. The seed planting unit of claim 10, wherein the actuator corresponds to a fluid-driven actuator coupled at one end to the depth adjustment lever and at an opposed end to one of the wheel support arm or a support member to which the wheel support arm is pivotally coupled.

12. The seed planting unit of claim 1, wherein the depth adjustment slot comprises a first depth adjustment slot and the guide pin comprises a first guide pin of the depth adjustment lever, further comprising an adjustment support plate positioned relative to the wheel support arm such that a gap is defined between the upper portion of the wheel support arm and the adjustment support plate, the adjustment support plate defining a second depth adjustment slot, the depth adjustment lever further comprising a second guide pin, the depth adjustment lever extending within the gap defined between the upper portion of the wheel support arm and the adjustment support plate such that the first guide pin is received within the first depth adjustment slot and the second guide pin is received within the second depth adjustment slot.

13. The seed planting unit of claim 12, wherein the adjustment support plate further defines a lever engagement slot separate from the second depth adjustment slot, a locking portion of the depth adjustment lever configured to be selectively engaged with the lever engagement slot at one of a plurality of locking positions defined by the lever engagement slot to maintain a position of the depth adjustment lever relative to the wheel support arm.

* * * * *